United States Patent [19]

Hsieh et al.

[11] Patent Number: 5,707,785
[45] Date of Patent: Jan. 13, 1998

[54] SPACERS FOR LIQUID CRYSTAL DISPLAYS

[75] Inventors: Ting-chiang Hsieh, Hsinchu; Yu-Hsia Fan, Chang-hua; Chin-Chen Lo, Hsinchu, all of Taiwan

[73] Assignee: Industrial Technology Research Institute, Hsinchu, Taiwan

[21] Appl. No.: 589,280

[22] Filed: Jan. 22, 1996

[51] Int. Cl.$^6$ ............................................. G02F 1/1339
[52] U.S. Cl. ................................. 430/321; 349/156
[58] Field of Search ................. 430/321, 20; 349/155, 349/156

[56] References Cited

U.S. PATENT DOCUMENTS

| | | | |
|---|---|---|---|
| 5,138,473 | 8/1992 | Dijon et al. | 349/155 |
| 5,328,728 | 7/1994 | Swirbel et al. | 427/600 |
| 5,338,240 | 8/1994 | Kim | 445/24 |
| 5,379,139 | 1/1995 | Sato et al. | 359/81 |
| 5,389,288 | 2/1995 | Rindo et al. | 252/299.01 |

FOREIGN PATENT DOCUMENTS

| | | |
|---|---|---|
| 61-173223 | 8/1986 | Japan. |
| 5-307181 | 11/1993 | Japan. |

*Primary Examiner*—John A. McPherson
*Attorney, Agent, or Firm*—George O. Saile; Stephen B. Ackerman; Larry J. Prescott

[57] ABSTRACT

The invention provides a spacer structure and a method of forming the spacer structure for providing uniform spacing between two transparent substrates of a Liquid Crystal Display. The spacer structure uses positive photoresist pads formed on opaque pads. The opaque pads are formed on one surface of one of the transparent substrates. The positive photoresist pads are formed using the opaque pads as a mask when exposing a layer of positive photoresist. The positive photoresist pads are self aligned to the opaque pads. The self alignment of the positive photoresist pads with the opaque pads make it possible to form several layers of positive photoresist pads on each opaque pad to achieve the desired spacer height.

18 Claims, 4 Drawing Sheets

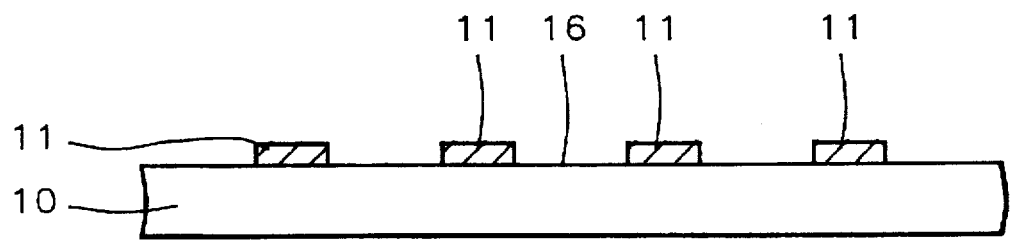
*FIG. 1A – Prior Art*
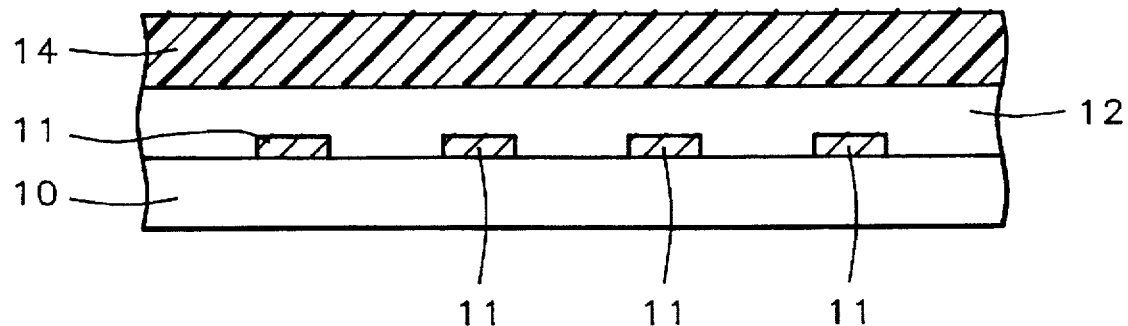
*FIG. 1B – Prior Art*
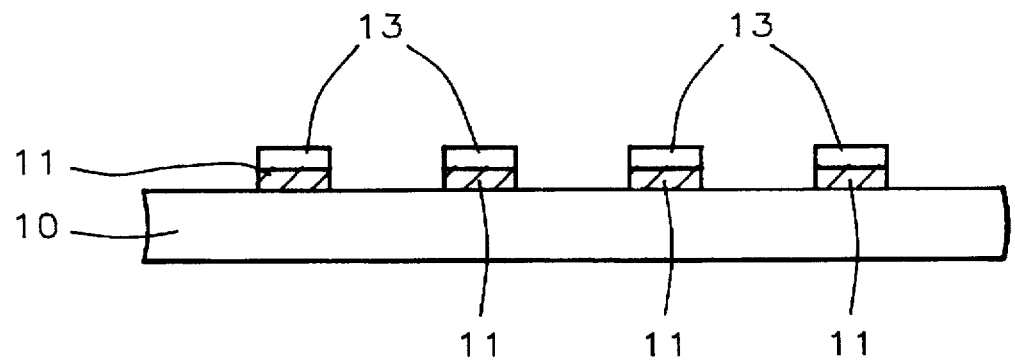
*FIG. 1C – Prior Art*

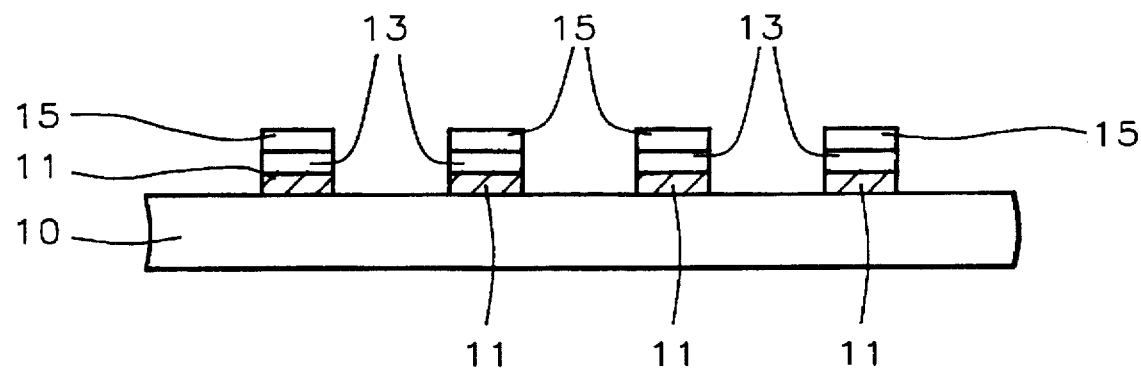
*FIG. 1D – Prior Art*
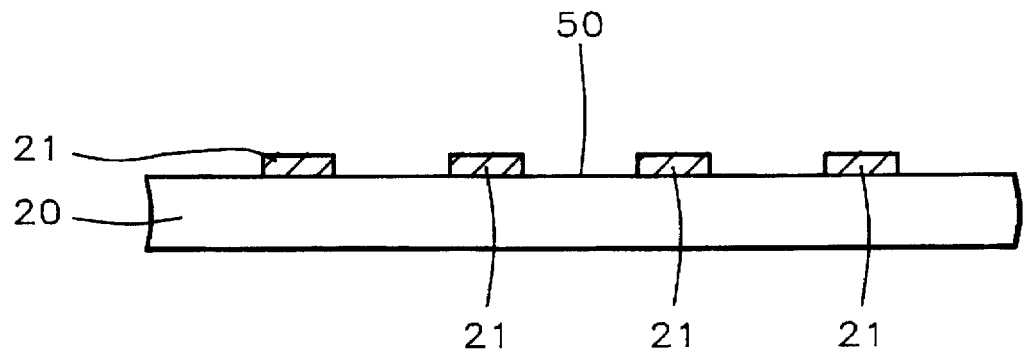
*FIG. 2*
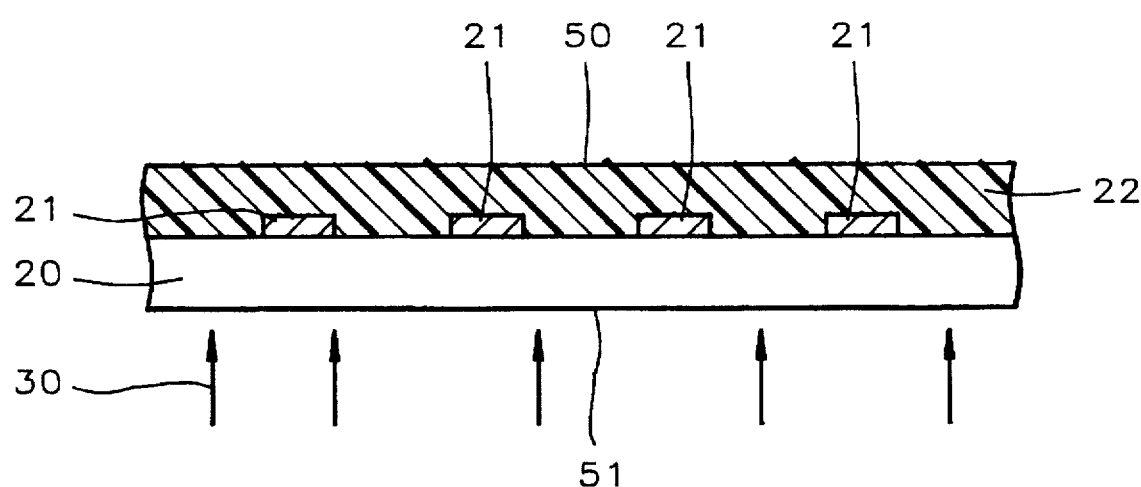
*FIG. 3*

5,707,785

SPACERS FOR LIQUID CRYSTAL DISPLAYS

BACKGROUND OF THE INVENTION (1) Field of the Invention

The invention relates to a method for forming spacers to provide substrate separation in Liquid Crystal Display structures. The spacers comprise positive photoresist pads formed on opaque pads. The positive photoresist pads are formed using the opaque pads as a mask and are self aligned to the opaque pads. Multiple layers of positive photoresist pads can be used to provide sufficient spacer height.

(2) Description of the Related Art

In Liquid Crystal Displays a liquid crystal material is disposed between two parallel transparent substrates. These transparent substrates must be separated uniformly across their entire area. A number of spacers uniformly distributed between the transparent substrates are usually used to provide uniform separation.

U.S. Pat. No. 5,328,728 to Swirbel et al. and U.S. Pat. No. 5,389,288 to Rindo et al. teach methods of providing Liquid Crystal Display spacing using ball type spacers. U.S. Pat. No. 5,379,139 to Sato et al. shows the use of photoresist pillars as spacers but does not teach how the pillars are formed. U.S. Pat. No. 5,338,240 to Kim teaches the use of elongated spacers placed out of the display regions.

In the invention of this Patent Application spacers uniformly distributed between the transparent substrates of a Liquid Crystal Display are used to provide the separation between the transparent substrates of the Liquid Crystal Display. The spacers comprise positive photoresist pads formed on opaque pads. The positive photoresist pads are formed using the opaque pads as a mask and are self aligned to the opaque pads. The self alignment of the positive photoresist pads to the opaque pads allows several layers of positive photoresist pads to be used to provide the separation required for the Liquid Crystal Display.

SUMMARY OF THE INVENTION

In liquid crystal displays, a liquid crystal material is disposed between a first surface of a first transparent substrate and a first surface of a second transparent substrate. The first surface of the first transparent substrate is parallel to the first surface of the second transparent substrate and separated from the first surface of the second transparent substrate by a number of spacers. The spacers must be able to provide a separation of between about 4 and 12 microns between the first surface of the first substrate and the first surface of the second substrate. The spacers must be uniformly distributed over the surfaces being separated to provide a high degree of parallelism between the surfaces and prevent bowing of the substrates. It is very desirable to have a high degree of flexibility in the size of the spacers and therefore in the resulting separation between the substrate surfaces.

A prior art method of forming spacers is shown in FIGS. 1A–1D. FIG. 1A shows base pads 11 formed on a first surface 16 of a substrate 10. As shown in FIG. 1B, a layer of spacer material 12 is formed on the first surface 16 of the transparent substrate 10 and a layer of photoresist 14 is formed on the layer of spacer material 12. Using photolithographic methods, first spacers 13 are formed on the base pads 11, as shown in FIG. 1C. The first spacers 13 are not self aligned to the base pads 11 and misalignment can occur. As shown in FIG. 1D, second spacers 15 can be formed on the first spacers 13 if required for added spacer height.. As more spacer layers are added the alignment problems become more severe.

It is a principle objective of this invention to provide a method of forming spacers between substrate surfaces in a liquid crystal display which can provide a wide range of separation distances by using self aligned spacer layers and which can be formed in a low cost process.

It is a further objective of this invention to provide a liquid crystal display structure using spacers to provide separation between the two facing substrate surfaces of the display wherein the spacers are low cost and provide a wide range of separation distances.

These objectives are achieved by forming a number of opaque pads, formed of a material such as chromium, molybdenum, or aluminum, on a first surface of a first transparent substrate. A layer of positive photoresist is then formed over the first surface of the first substrate covering the opaque pads. The positive photoresist is then exposed by means of a light beam through the second surface of the first substrate thereby using the opaque pads as a mask. The positive photoresist is then developed leaving a layer of photoresist on the opaque pads. This layer of photoresist on the opaque pads can then be used as a spacer or a second layer of photoresist can be formed over the first surface of the first substrate. The photoresist is again exposed by a light beam passing through the second surface of the first substrate. The photoresist process can be repeated as many times as necessary until the desired spacer height is reached. The layers of photoresist on the opaque pads are self aligned to the opaque pads.

BRIEF DESCRIPTION OF THE DRAWINGS

FIG. 1A shows a cross section view of base pads on a transparent substrate for a prior art method of forming spacers.

FIG. 1B shows a cross section view of a layer of spacer material and a layer of photoresist formed on a transparent substrate with base pads for a prior art method of forming spacers.

FIG. 1C shows a cross section view of prior art spacers formed of a base pad and one layer of spacer material on a transparent substrate.

FIG. 1D shows a cross section view of prior art spacers formed of a base pad and two layers of spacer material on a transparent substrate.

FIG. 2 shows a cross section view of opaque pads formed on a first surface of a transparent substrate for the method of this invention.

FIG. 3 shows a cross section view of a first layer of positive photoresist formed on a transparent substrate covering the opaque pads, with the light beam exposing the first layer of positive photoresist through the second surface of the transparent substrate.

DESCRIPTION OF THE PREFERRED EMBODIMENTS

Figure 4:
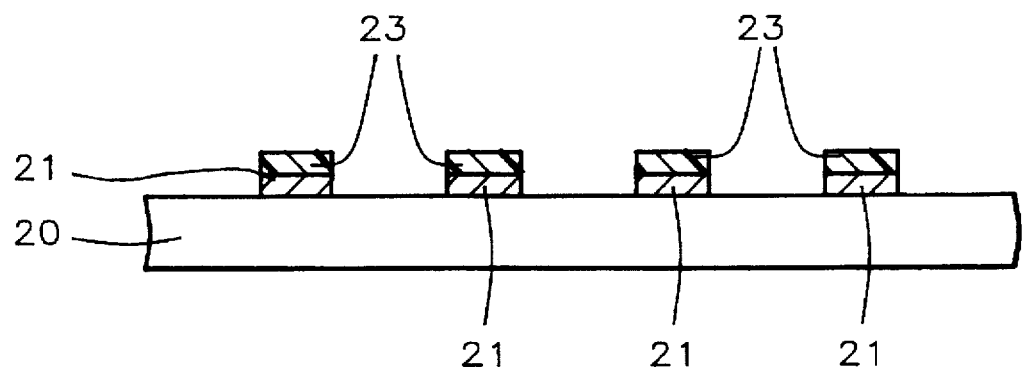
FIG. 4 shows a cross section view of the first photoresist pads formed on the opaque pads.

Refer now to FIGS. 2–7, there is shown the principle embodiment for forming the spacers of this invention. As shown in FIG. 2, opaque pads 21, formed from a material such as chromium, molybdenum, or aluminum and having a thickness between about 500 and 2000 Angstroms, are formed on a first surface 50 of a first transparent substrate 20. The opaque pads 21 can also be formed from black photosensitive material having a tickness of between about 0.1 and 2.0 microns. Next, as shown in FIG. 3, a first layer of positive photoresist 22, having a tickness of between about 1 and 3 microns, is formed on the first surface 50 of the first transparent substrate 20 covering the opaque pads 21. A light beam 30 is then passed through the second surface 51 of the first transparent substrate 20 to expose the first layer of positive photoresist 22. The opaque pads 21 act as a mask so that when the exposed first layer of positive photoresist 22 is developed photoresist remains only on the opaque pads 21 forming a first photoresist pad 23, see FIG. 4. The first photoresist pads 23 are self aligned to the opaque pads 21 so that there are no alignment problems. Depending on the height requirements of the spacers the spacers can be formed from the opaque pads 21 and the first photoresist pads 23 as shown in FIG. 4.

Figure 5:
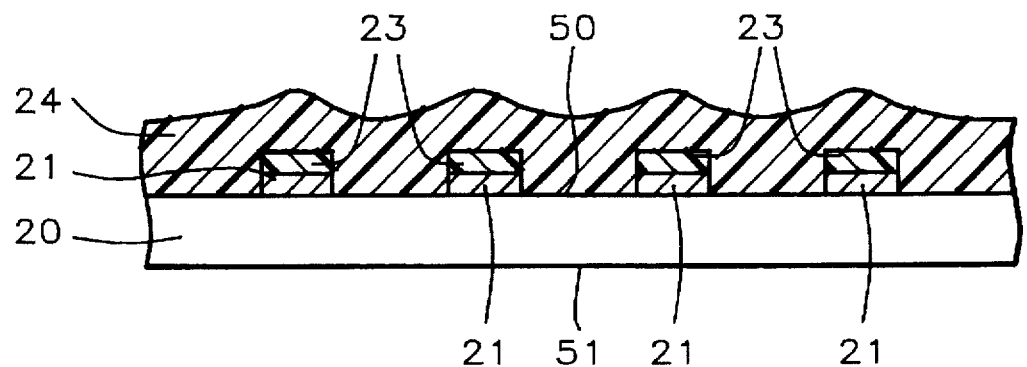
FIG. 5 shows a cross section view of a second layer of positive photoresist formed on a transparent substrate covering the opaque pads, with the light beam exposing the second layer of positive photoresist through the second surface of the transparent substrate.

If greater spacer height is required a second layer of positive photoresist 24, having a thickness of between about 1 and 3 microns, is formed on the first surface 50 of the first transparent substrate 20 covering the opaque pads 21 and the first photoresist pads 23, as shown in FIG. 5. A light beam 30 is then passed through the second surface 51 of the first transparent substrate 20 to expose the second layer of positive photoresist 24. The opaque pads 21 act as a mask so that when the exposed second layer of positive photoresist 24 is developed photoresist remains only on the first photoresist pads 23 forming second photoresist pads 25, see FIG. 6. The second photoresist pads 25 are self aligned to the opaque pads 21 and the first photoresist pads 23 so that there are no alignment problems.

Figure 6:
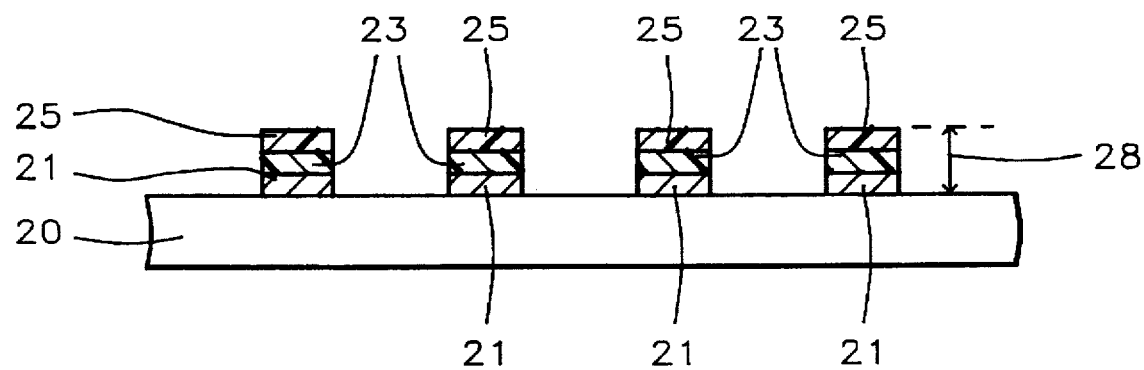
FIG. 6 shows a cross section view of the second photoresist pads formed on the first photoresist pads and the opaque pads.

As shown in FIG. 6, depending on the requirement for the spacer height 28, the spacers can be formed from the opaque pads 21, the first photoresist pads 23, and the second photoresist pads 25. A spacer height 28 of between about 4 and 12 microns is usually required for liquid crystal displays.

More levels of photoresist, not shown, can be added using the same method as described above if required to provide sufficient spacer height. In like manner third photoresist pads can be formed on the second photoresist pads. A third layer of positive photoresist, having a thickness of between about 0.5 and 3 microns, is formed on the first surface of the first transparent substrate covering the opaque pads, the first photoresist pads, and the second photoresist pads. A light beam is again passed through the second surface of the first transparent substrate to expose the third layer of positive photoresist. The opaque pads again act as a mask so that when the exposed third layer of positive photoresist is developed photoresist remains only on the second photoresist pads forming third photoresist pads. The third photoresist pads are self aligned to the opaque pads, the first photoresist pads, and the second photoresist pads so that there are no alignment problems. In like manner fourth photoresist pads can be formed on the third photoresist pads. A fourth layer of positive photoresist, having a thickness of between about 0.2 and 3 microns, is formed on the first surface of the first transparent substrate covering the opaque pads, the first photoresist pads, the second photoresist pads, and the third photoresist pads. A light beam is again passed through the second surface of the first transparent substrate to expose the fourth layer of positive photoresist. The opaque pads again act as a mask so that when the exposed fourth layer of positive photoresist is developed photoresist remains only on the third photoresist pads forming fourth photoresist pads. The fourth photoresist pads are self aligned to the opaque pads, the first photoresist pads, the second photoresist pads, and the third photoresist pads so that there are no alignment problems. Since each layer of photoresist pad is self aligned to previous layers, six or more layers of photoresist pads can be used to provide sufficient spacer height without alignment problems.

Figure 7:
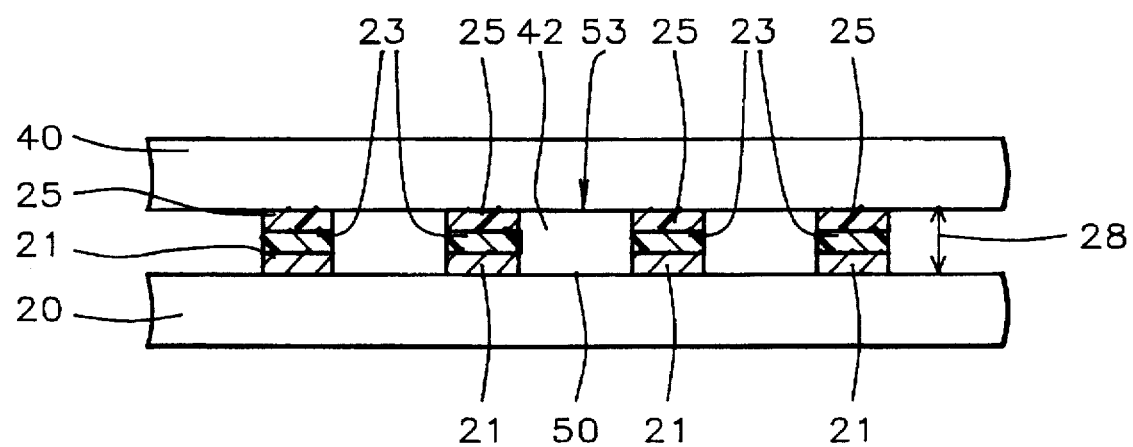
FIG. 7 shows two transparent substrates with liquid crystal material disposed between separated by the spacers of this invention.

As shown in FIG. 7, a second substrate 40 having a first surface 53 is then brought together with the first transparent substrate 20 so that the first surface 53 of the second substrate 40 contacts the spacer formed on the first surface 50 of the first transparent substrate 20. In this example the first surface 53 of the second substrate 40 contacts the second photoresist pads 25 but it will be readily apparent to those skilled in the art that the spacer could have more or fewer photoresist pad layers. The space 42 between the first surface 53 of the second substrate 40 and the first surface 50 of the first transparent substrate 20 is then filled with a liquid crystal material. The second substrate 40 can be transparent if desired.

Refer now to FIG. 7, there is shown an embodiment of a liquid crystal display structure using spacers provided by this invention to provide spacing between the opposing surfaces of the substrates of the liquid crystal display. Opaque pads 21, formed of a material such as chromium, molybdenum, or aluminum, are formed on a first surface 50 of a first transparent substrate 20.

First photoresist pads 23, formed of a positive photoresist material, are formed on the opaque pads 21. Since the first photoresist pads 23 are formed using the opaque pads 21 as a mask they are self aligned to the opaque pads 21. If required for spacer height, second photoresist pads 25, formed of a positive photoresist material, are formed on the first photoresist pads 23. Since the second photoresist pads 25 are formed using the opaque pads 21 as a mask they are self aligned to the opaque pads 21. Depending on the requirements for the spacer height 28 the spacer may nor include the second photoresist pads 25 or additional layers of photoresist pads, not shown, may be used. Because all layers of photoresist pads are self aligned to the opaque pads 21 as many as six or more layers of photoresist pads can be used without alignment problems.

A first surface 53 of a second substrate 40 is then brought into contact with the spacers, in this example the second photoresist pads 25, to provide a separation distance 28 between the first surface 50 of the first transparent substrate 20 and the first surface 53 of the second substrate 40. The separation distance 28 is between about 5 and 12 microns. The space 42 between the first surface 50 of the first transparent substrate 20 and the first surface 53 of the second substrate 40 is filled with liquid crystal material. The second substrate 40 can be transparent if desired.

While the invention has been particularly shown and described with reference to the preferred embodiments thereof, it will be understood by those skilled in the art that various changes in form and details may be made without departing from the spirit and scope of the invention.

What is claimed is:

1. A method of forming spacers, comprising the steps of:
    providing a first substrate having a first surface and a second surface wherein said first substrate is transparent and said first surface of said first substrate and said second surface of said first substrate are parallel to each other;

providing a second substrate having a first surface and a second surface wherein said first surface of said second substrate and said second surface of said second substrate are parallel to each other;

forming a number of opaque pads on said first surface of said first substrate;

forming a first layer of positive photoresist on said first surface of said first substrate after said opaque pads have been formed;

exposing said first layer of positive photoresist by means of a light beam illuminating said second surface of said first substrate thereby using said opaque pads as a mask;

developing said first layer of positive photoresist thereby forming a first spacer pad on each said opaque pad;

forming a second layer of positive photoresist on said first surface of said first substrate after said first spacer pads have been formed;

exposing said second layer of positive photoresist by means of a light beam illuminating said second surface of said first substrate thereby using said opaque pads as a mask;

developing said second layer of positive photoresist so that only that part of said second layer of photoresist directly over said opaque pads and said first spacer pads remains, thereby forming a second spacer pad on each of said first spacer pads;

bringing together said first substrate and said second substrate so that said first surface of said second substrate contacts said second spacer pads; and placing liquid crystal material between said first surface of said first substrate and said first surface of said second substrate.

2. The method of claim 1 further comprising:

forming a third layer of positive photoresist on said first surface of said first substrate after said second spacer pads have been formed;

exposing said third layer of positive photoresist by means of a light beam illuminating said second surface of said first substrate thereby using said opaque pads as a mask; and developing said third layer of positive photoresist so that only that part of said third layer of photoresist directly over said second spacer pads remains thereby forming a third spacer pad on each of said second spacer pads wherein said first surface of said second substrate contacts said third spacer pads.

3. The method of claim 2 further comprising:

forming a fourth layer of positive photoresist on said first surface of said first substrate after said third spacer pads have been formed;

exposing said fourth layer of positive photoresist by means of a light beam illuminating said second surface of said first substrate thereby using said opaque pads as a mask; and developing said fourth layer of positive photoresist so that only that part of said fourth layer of photoresist directly over said third spacer pads remains thereby forming a fourth spacer pad on each of said third spacer pads wherein said first surface of said second substrate contacts said fourth spacer pads.

4. The method of claim 1 wherein said opaque pads are formed of chromium having a thickness of between about 500 and 1500 Angstroms.

5. The method of claim 1 wherein said opaque pads are formed of molybdenum having a thickness of between about 500 and 1500 Angstroms.

6. The method of claim 1 wherein said opaque pads are formed of aluminum having a thickness of between about 500 and 1500 Angstroms.

7. The method of claim 1 wherein said opaque pads are formed from black photosensitive material having a thickness of between about 0.1 and 2.0 microns.

8. The method of claim 1 wherein the thickness of said first layer of positive photoresist is between about 1 and 3 microns.

9. The method of claim 1 wherein the thickness of said second layer of positive photoresist is between about 1 and 3 microns.

10. The method of claim 2 wherein the thickness of said third layer of positive photoresist is between about 0.5 and 3 microns.

11. The method of claim 3 wherein the thickness of said fourth layer of positive photoresist is between about 0.2 and 3 microns.

12. A liquid crystal display structure, comprising:

a first substrate having a first surface and a second surface wherein said first substrate is transparent and said first surface of said first substrate and said second surface of said first substrate are parallel to each other;

a number of opaque pads formed on said first surface of said first substrate;

a number of first spacer pads wherein one of said first spacer pads is formed on each said opaque pad;

a number of second spacer pads wherein one of said second spacer pads is formed on each of said first spacer pads;

a second substrate having a first surface and a second surface, wherein said first surface of said second substrate and said second surface of said second substrate are parallel to each other, positioned so that said first surface of said second substrate contacts said second spacer pads; and a liquid crystal material between said first surface of said first substrate and said first surface of said second substrate.

13. The liquid crystal display structure of claim 12 wherein said first spacer pads and said second spacer pads are formed from positive photoresist.

14. The liquid crystal display structure of claim 12 further comprising a number of third spacer pads formed of positive photoresist, wherein one of said third spacer pads is formed on each of said second spacer pads, and a number of fourth spacer pads formed of positive photoresist, wherein one of said fourth spacer pads is formed on each of said third spacer pads, and said first surface of said second substrate contacts said fourth spacer pads.

15. The liquid crystal display structure of claim 12 wherein said opaque pads are chromium with a thickness of between about 500 and 1500 Angstroms.

16. The liquid crystal display structure of claim 12 wherein said opaque pads are molybdenum with a thickness of between about 500 and 1500 Angstroms.

17. The liquid crystal display structure of claim 12 wherein said opaque pads are aluminum with a thickness of between about 500 and 1500 Angstroms.

18. The liquid crystal display structure of claim 12 wherein said opaque pads are formed from black photosensitive material having a thickness of between about 0.1 and 2.0 microns.

* * * * *

US005707785C1

(12) EX PARTE REEXAMINATION CERTIFICATE (10049th)
United States Patent
Hsieh et al.

(10) Number: US 5,707,785 C1
(45) Certificate Issued: Feb. 21, 2014

(54) SPACERS FOR LIQUID CRYSTAL DISPLAYS

(75) Inventors: Ting-chiang Hsieh, Hsinchu (TW);
Yu-Hsia Fan, Chang-hua (TW);
Chin-Chen Lo, Hsinchu (TW)

(73) Assignee: Industrial Technology Research Institute, Chutung Town, Hsinchu Hsien (TW)

Reexamination Request:
No. 90/012,459, Aug. 31, 2012

Reexamination Certificate for:
Patent No.: 5,707,785
Issued: Jan. 13, 1998
Appl. No.: 08/589,280
Filed: Jan. 22, 1996

(51) Int. Cl.
*G02F 1/13* (2006.01)
*G02F 1/1339* (2006.01)

(52) U.S. Cl.
CPC ................... *G02F 1/1339* (2013.01)
USPC .......................... 430/321; 349/156

(58) Field of Classification Search
None
See application file for complete search history.

(56) References Cited

To view the complete listing of prior art documents cited during the proceeding for Reexamination Control Number 90/012,459, please refer to the USPTO's public Patent Application Information Retrieval (PAIR) system under the Display References tab.

*Primary Examiner* — Timothy Speer

(57) ABSTRACT

The invention provides a spacer structure and a method of forming the spacer structure for providing uniform spacing between two transparent substrates of a Liquid Crystal Display. The spacer structure uses positive photoresist pads formed on opaque pads. The opaque pads are formed on one surface of one of the transparent substrates. The positive photoresist pads are formed using the opaque pads as a mask when exposing a layer of positive photoresist. The positive photoresist pads are self aligned to the opaque pads. The self alignment of the positive photoresist pads with the opaque pads make it possible to form several layers of positive photoresist pads on each opaque pad to achieve the desired spacer height.

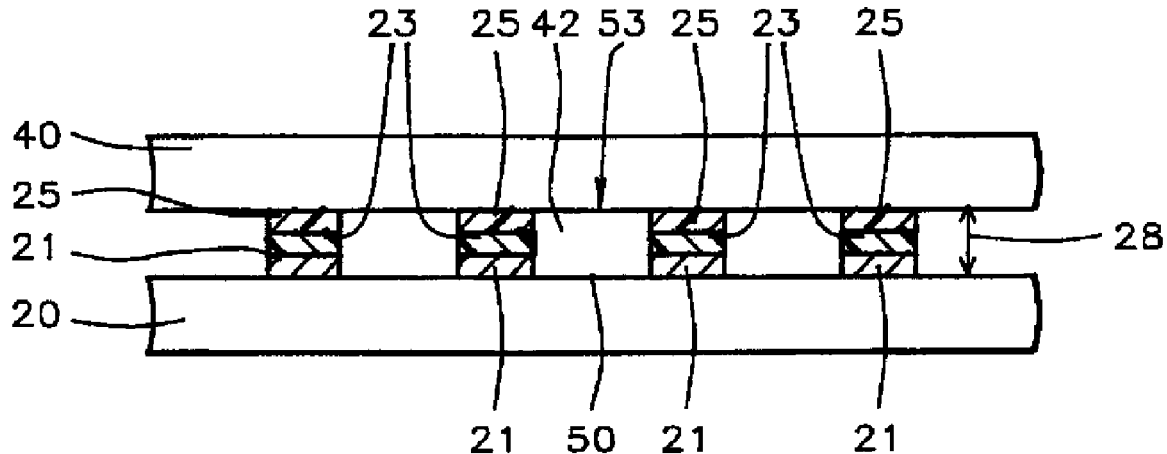

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claim 12 is cancelled.

Claims 1-11 and 13-18 were not reexamined.

* * * * *